Patented Feb. 16, 1926.

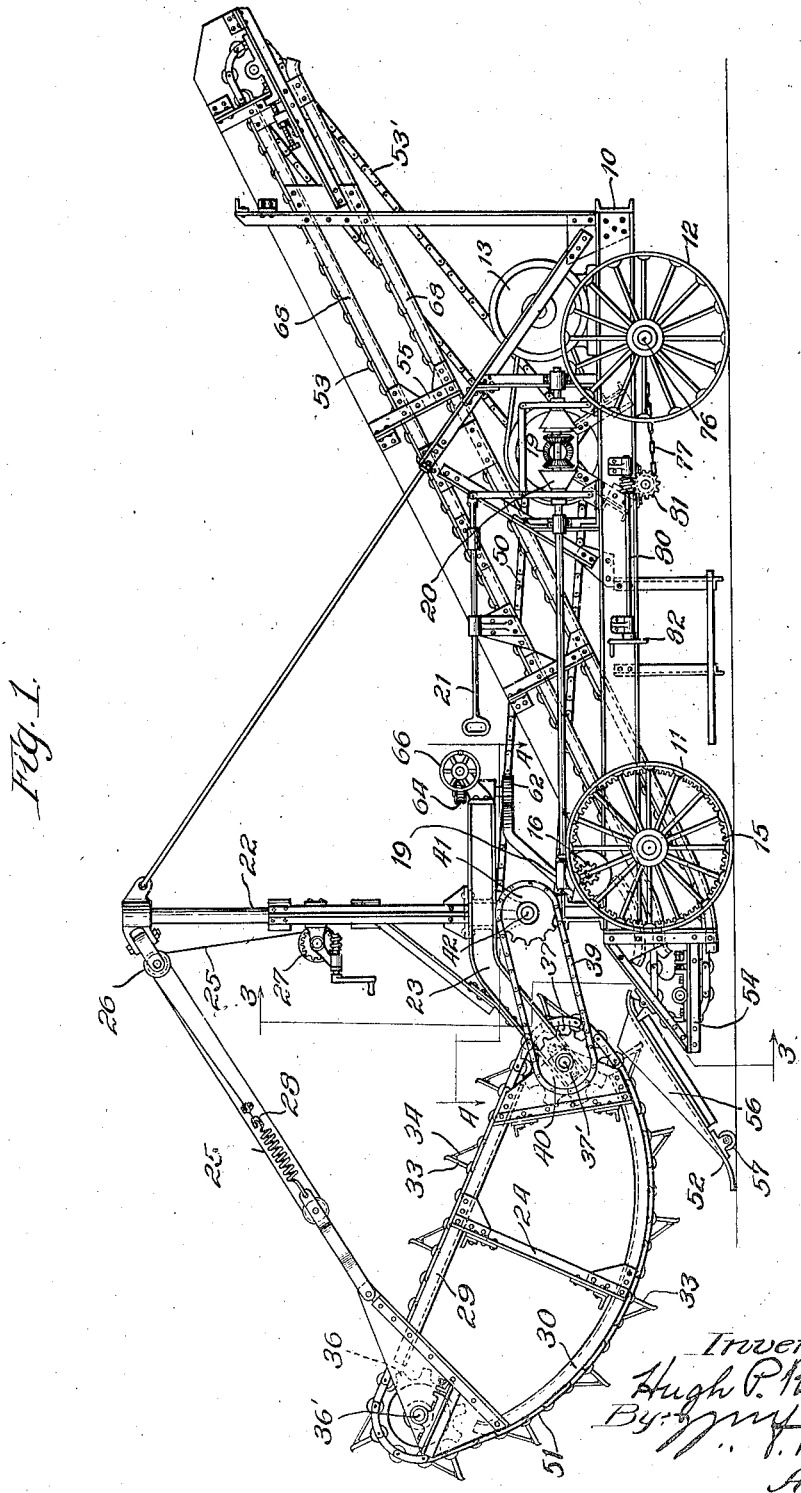

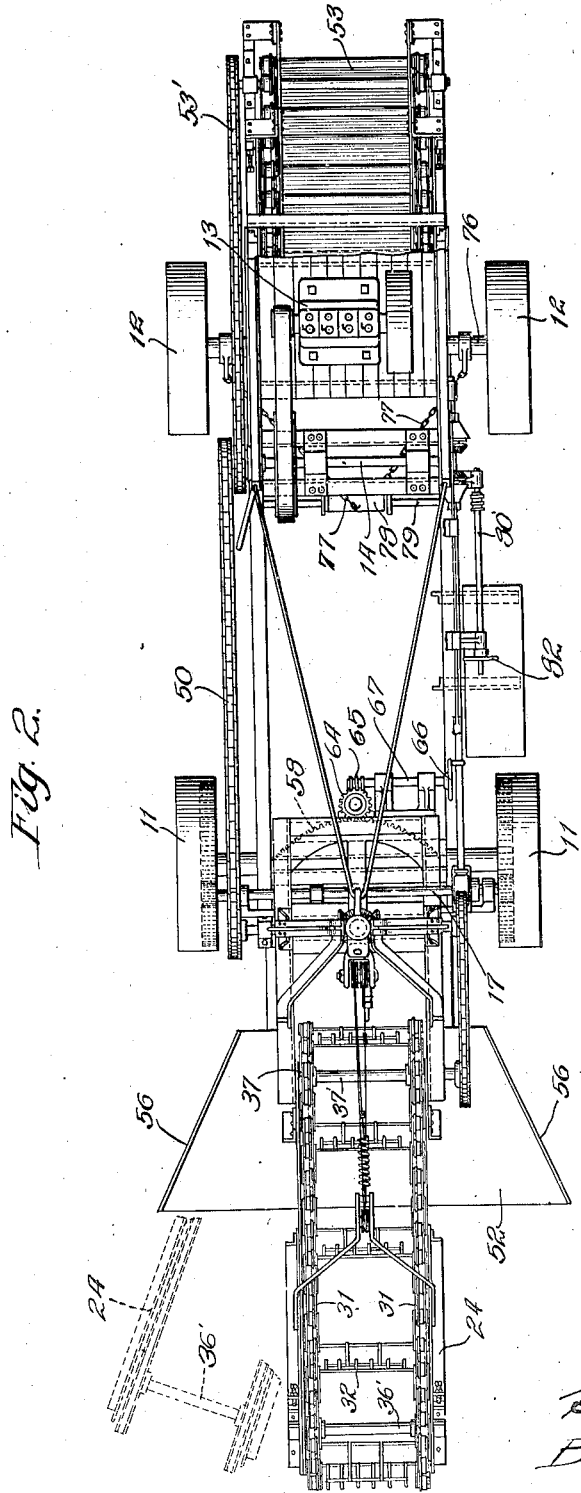

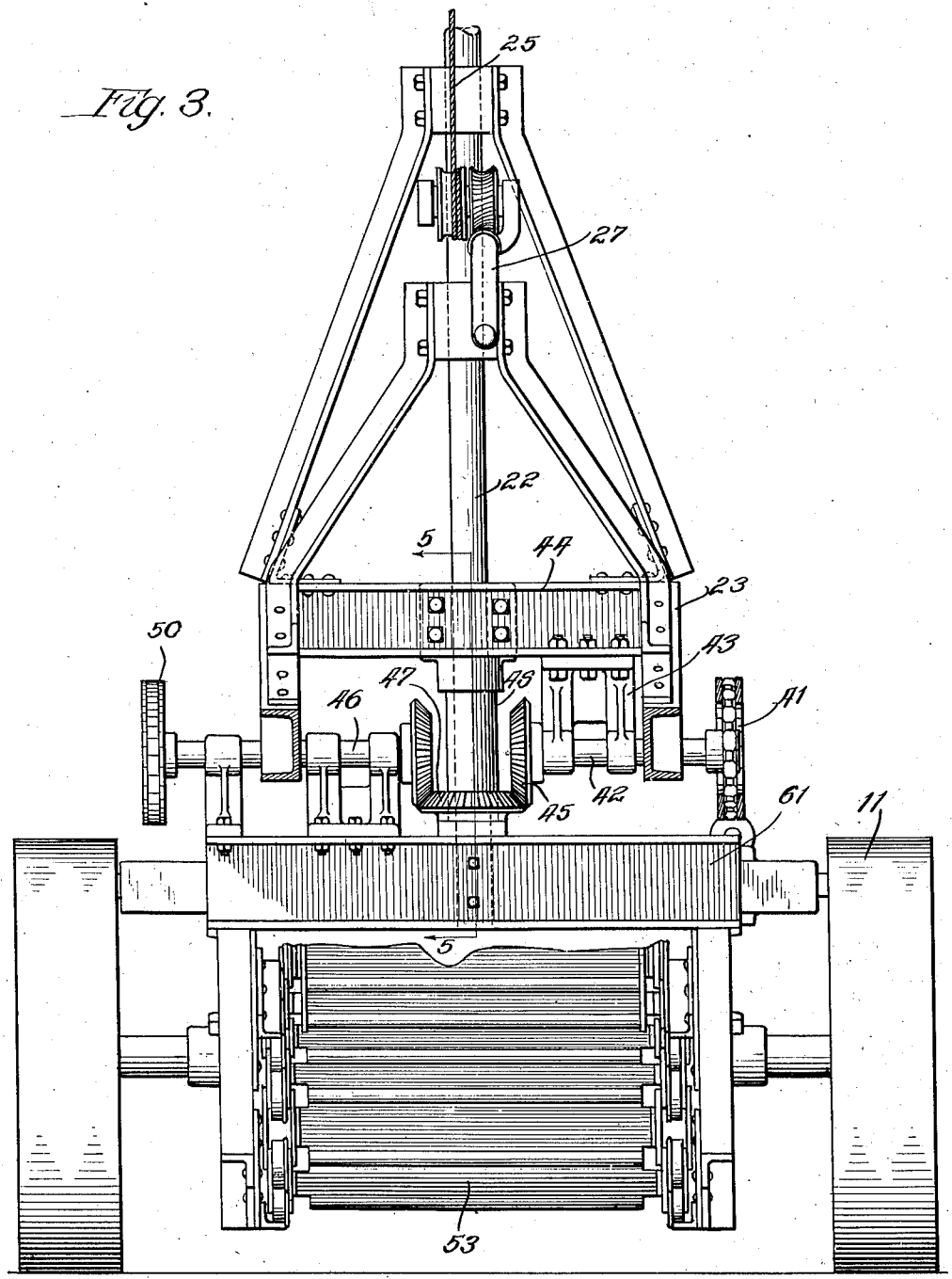

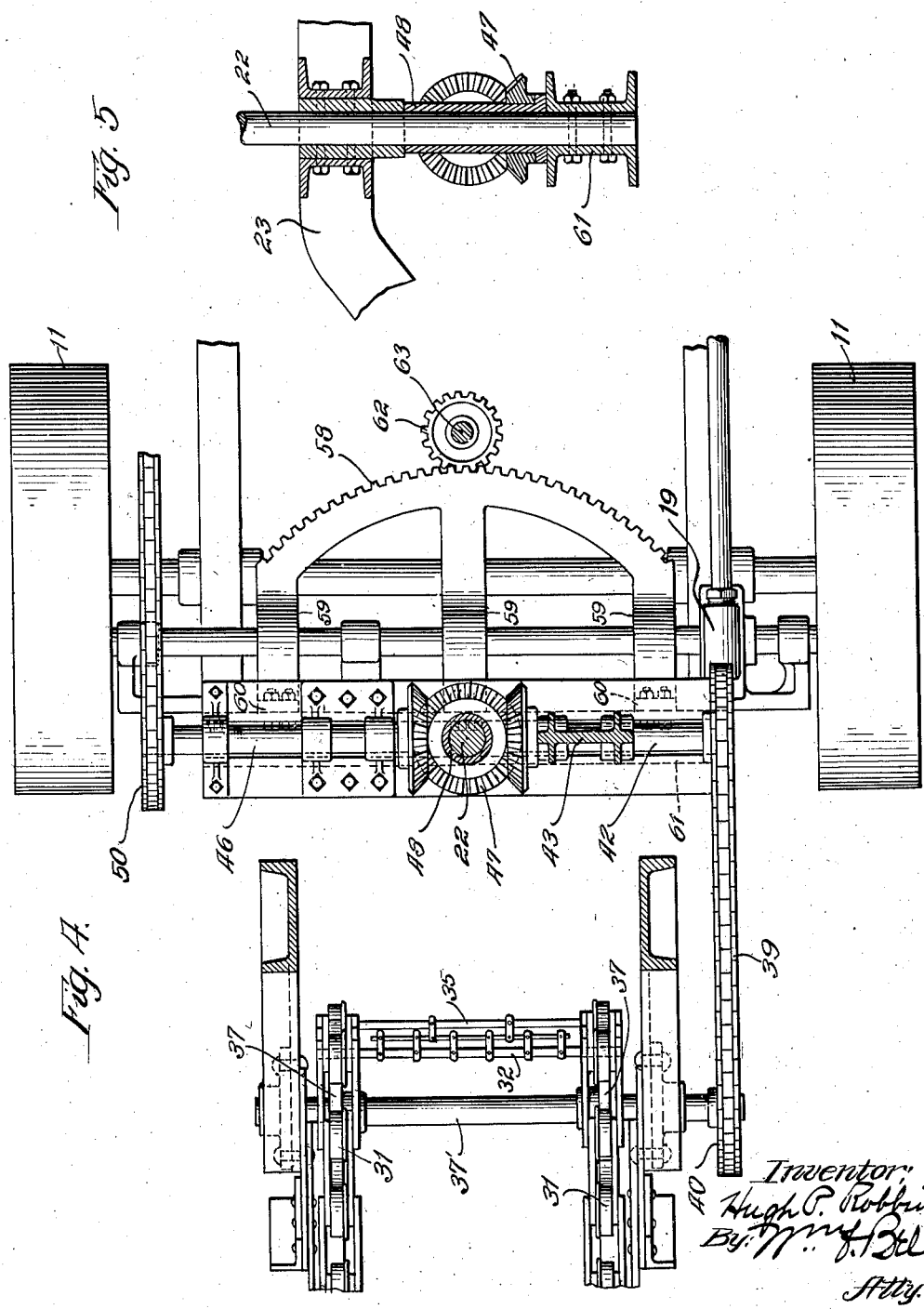

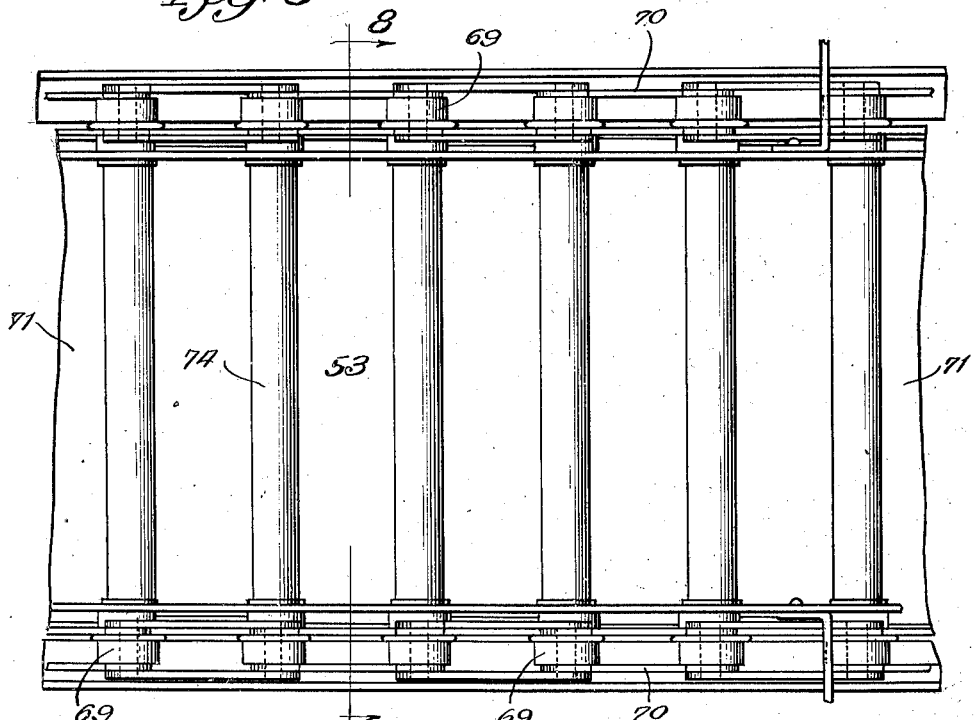
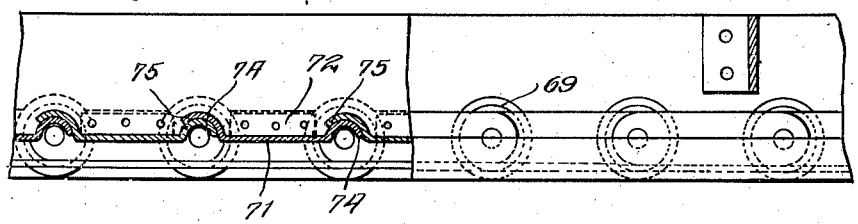
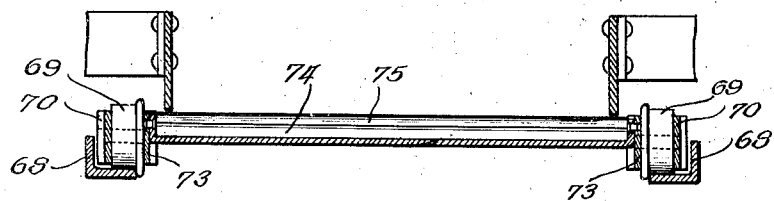

1,573,125

UNITED STATES PATENT OFFICE.

HUGH P. ROBBINS, OF CHICAGO, ILLINOIS.

AUTOMATIC LOADER.

Application filed July 17, 1920. Serial No. 397,072.

*To all whom it may concern:*

Be it known that I, HUGH P. ROBBINS, a citizen of the United States, residing at Chicago, in the county of Cook and State of Illinois, have invented certain new and useful Improvements in Automatic Loaders, of which the following is a specification.

This invention relates to automatic loading machines but more particularly to combined excavators and loaders and has for its primary object to provide a simple, strong and convenient construction which will rapidly and efficiently dig into a mass of gravel, coal, sugar beets, potatoes or the like and convey the excavated material into a wagon, car or other place of deposit.

One important object is to provide a digger which may be readily adjusted vertically to conform to the changing contour of the mass being excavated and laterally of the conveying means to excavate a considerable area.

Further objects are to provide for automatic yielding of the digger when the rakes or scraper blades meet with unusual resistance; to cause the rakes or scrapers to engage and act upon the pile or mass without injury to the material; and to so form the digger that the rakes or scrapers may be caused to operate upon any conformation of mass.

The present invention is intended for use in excavating and conveying the excavated material into a car or other place of deposit and is preferably mounted upon a suitable frame fitted with wheels or rollers arranged to be self-propelling or moved by teams or tractors.

The machine consists primarily of a digger and a conveyor which are so constructed and arranged that the material excavated by the digger is drawn upwardly over an apron and deposited upon the conveyor. The digger is preferably so mounted that it may be adjusted vertically to engage in the most advantageous manner the mass to be excavated and also be swung horizontally on its support to cover a large area without moving the remaining portion of the structure.

The digger comprises a frame on which are mounted guides supporting an endless belt or chain having rakes or scrapers secured thereto at peripheral intervals. The frame and guides are preferably so formed that the under or operating face of the digger is arched and the arch is of considerable length of radius. The digger is supported on a frame and is capable of being swung thereon either horizontally or vertically. The digger is preferably so supported that it is capable of yielding when the rakes or scrapers meet with unusual resistance and thus danger of breaking of parts is obviated. The digger is intended to gradually dig its way into any pile of material either in a straight line or covering the arc of operation available.

The form of the conveyor would depend upon the type of material to be handled and any well-known form of belt, carrying pans, or the like might be used.

The many other features and advantages of this invention will be better understood by reference to the following specifications when read in connection with the accompanying drawings illustrating a selected embodiment thereof in which Fig. 1 is a side elevation of the invention complete.

Fig. 2 is a top plan view.

Fig. 3 is a vertical section on the line 3—3 of Fig. 1.

Fig. 4 is a horizontal section on the line 4—4 of Fig. 1.

Fig. 5 is a vertical section on the line 5—5 of Fig. 3.

Fig. 6 is an enlarged detail plan view of the endless belt.

Fig. 7 is a side elevation partly in section of the portion of the structure shown in Fig. 6.

Fig. 8 is a section on the lines 8—8 of Fig. 6.

Referring to the drawings, the selected embodiment of the invention is shown to comprise a main frame 10 mounted on front wheels 11 and rear wheels 12 to render the same readily portable. An engine 13 is mounted on this frame 10 and drives the main shaft 14. This main shaft 14 forms the driving shaft for both the operating and the propelling mechanism. Both of the wheels 11 are provided with an interior gear or rack 15 engaged by pinions 16 on shaft 17 operated by shaft 18 which in turn is driven by the main shaft 14 through the medium of the gearing 19 and the differential 19'. Clutches 20 operated by the handle 21 control gearing 19 and permit the device to be propelled forwardly or rearwardly.

An upright post 22 is mounted upon one end of the frame 10. On this post 22 is revolubly mounted the frame 23 on the outer projections of which is hingedly mounted the inner end portion of the digger 24. The outer end portion of the digger is supported by the cable 25 passing over the pulley 26 and having its inner end connected to the hoisting device 27. One end of the cable is secured to the upper extremity of the spring 28 which has its lower extremity connected to the digger so that the outer portion of such digger is yieldingly supported by the cable.

The digger comprises a frame 29 provided with guides 30 for the endless chains 31. A plurality of cross rods 32 connect these chains 31 and on such rods are secured the rake teeth 33 which are supported by the brace rods 34 having their lower extremities secured to corresponding cross rods 35. The chains 31 travel over sprockets 36 on the shaft 36' at the forward end of the digger and over sprockets 37 on the shaft 37' at the rear end thereof. The brace rods 34 may be formed of resilient material to permit a yielding action of the rake teeth 33.

The digger is operated by means of the chain 39 passing over the sprocket 40 on the shaft 37', on which the digger is pivotally mounted, and over the sprocket 41 upon the driving shaft 42 supported by the bracket 43 on the cross arm 44 on the revoluble frame 23. This shaft 42 is driven by the bevel gear 45 which in turn is driven by the shaft 46 through the medium of the gear 47 mounted on the sleeve 48. The shaft 46 is provided at its outer end with a sprocket 49 over which passes the driving chain 50 driven by the shaft 14.

The operating face 51 of the digger is preferably arched so that it will engage a pile or bank and draw the material downwardly and inwardly to the apron 52 and then upwardly to the conveyor 53 on the frame 10. The digger is raised or lowered by means of the hoisting apparatus 27 to secure the relative position of the rake teeth and the face of the mass to be excavated to produce the most advantageous results.

Any suitable form of endless belt or chains may be used to carry the rakes 33 but I have found that two strands of heavy steel roll chain operate very satisfactorily. The rakes or scrapers are preferably inserted between these chains at intervals of from 24 to 36 inches although such intervals may be varied as required by the material to be handled. The frame 23 is revolubly mounted on the frame 10 so that the digger with its supporting frame may swing horizontally to enable the digger to cover an arc of from 45 to 90 degrees according to the requirements.

When the rakes or scrapers strike unusual resistance, the extra pressure thus encountered will simply force the digger to swing upwardly on its horizontal pivot and clear the obstruction. If a few successive rakes or scrapers fail to dislodge this obstruction in passing over it, the operator will naturally be advised of the fact and have the opportunity to manoeuver about or remove the obstacle. This is a particularly important feature as it prevents breakage of the rakes or scrapers. In the present embodiment the teeth of the rakes are set approximately six inches apart but this disposition may be varied for different materials.

The apron 52 is pivotally mounted at its upper end upon the lower extremity 54 of the conveyor frame 55 and is preferably of sufficient width to permit the swinging of the digger horizontally as far as practicable in the manner indicated in dotted lines in Fig. 2 of the drawings. The apron is preferably provided with side guard plates 56. The lower end of the apron is supported by small wheels or rollers 57 in order that the machine may be advanced as the excavating operation progresses. Irregularities of the ground are compensated for by pivotally mounting the apron. The lower edge of the apron will be in close proximity to the ground so that the material drawn inwardly by the rakes or scraper blades on the digger will be guided upwardly on to the conveyor 53. On account of the curved formation of the face of the digger, the rakes continue to operate upon the excavated material and such material continues to be engaged and advanced by the rakes until it passes off the apron 52 and is deposited on the conveyor.

Horizontal swinging of the digger is accomplished by means of the rack 58 supported by the arms 59 having their lower extremities 60 bolted to the stationary member 61 of the main frame 10. This rack is engaged by the pinion 62 mounted on the shaft 63 supported by the frame 23. A worm gear 64 is secured upon the upper end of this shaft 63 and is operated by the worm 65 likewise mounted on the frame 23 and such worm is controlled by the hand wheel 66 on the shaft 67.

The conveyor 53 may be of any suitable form or type depending on the material to be conveyed but I have found a particularly advantageous form to be that best shown in Figs. 6 to 8 inclusive of the drawings. This conveyor is supported by a pair of guides 68 mounted on the frame 10 and in these guides operate the rollers 69 of usual type in the chain 70. The floor of the conveyor consists of a plurality of plates 71 provided with upturned flanges 72 at the side edges thereof which are secured to the inner links 73 of the chains in the manner shown in Fig. 8. The forward and rear edge portions 74 and 75 respectively of each of these plates are bent into curved form to interlock with the corresponding edge portions of the next adjacent plates, as best shown in Fig. 7, to permit the plates to slide relatively to each other as the conveyor passes about the sprockets. These curved edge portions preferably overlap sufficiently so that overlapping shall always be maintained in all positions of the conveyor and yet there should be sufficient clearance at the rear edge of each plate so that this edge will not jam with the top face of the next succeeding plate in any position of the conveyor. The rear edge portion of each plate rests upon the forward edge portion of the next succeeding plate.

The lower end of the conveyor preferably passes below the upper extremity of the apron so that the material forced upwardly on such apron drops upon the conveyor. The conveyor is driven by the chain 53' from the driving shaft 14.

The machine is usually transported under its own power with the conveyor end in front. The axle 76 on which are mounted the wheels 12 is preferably connected to the frame 10 by a king pin (not shown) and this axle may be swung horizontally to guide the machine by means of the chain 77 passing over drum 78 on shaft 79. This shaft 79 is operated by the shaft 80 through the medium of the worm gearing 81 and said shaft 80 is provided at its extremity with a hand wheel 82 for manual operation.

It will thus be seen that the apparatus is self-propelled and capable of being moved forwardly as the work progresses. The digger is lowered by means of the hoisting device 27 until the teeth of the rakes or scraper blades engage the mass sufficiently and then as the excavation proceeds the digger continues to be lowered until a sufficient depth has been reached. The digger is then swung to the right or to the left and the operation is repeated until the entire available area has been covered. The machine is then advanced sufficiently to bring the digger into proper position for excavating a new area. By having the lower or operating face of the digger curved and of long radius of curvature, it is possible to engage and excavate any form of pile or mass and to operate upon a vertical or a horizontal or an inclined or irregular surface. The operator raises or lowers the digger so that the rake teeth engage the mass in the most advantageous manner.

The spring connection between the supporting cable 26 and the outer end of the digger is particularly advantageous for the weight of the digger causes this spring to be extended before the digger is brought into engagement with the material to be excavated and thus the rakes are comparatively lightly pressed into the material and the digger readily yields upwardly when the rakes meet with unusual resistance. This gentle entry of the rakes into the material to be excavated prevents injury to such material and is particularly advantageous when the machine is being used to load potatoes, sugar beets or the like from a pile. Instead of using the spring connection and the hoisting device in connection with the cable to support the digger, a counter weight, preferably weighing slightly less than the digger, might be secured to the inner end of the cable and the outer end of the cable secured directly to the digger. This is such a well-known construction that no illustration is deemed necessary.

I claim:

1. In a machine for loading piled, loose material, the combination of a frame, an inclined conveyor extending lengthwise to the frame, a digger pivoted adjacent to the receiving end of the conveyor to swing horizontally and vertically, and an apron between said digger and said conveyor and pivotally mounted independently of the digger.

2. In a loading machine for piled, loose material, the combination of a frame, an inclined conveyor extending lengthwise to the frame, a digger pivotally mounted on the frame adjacent to the receiving end of the conveyor and adapted to swing both horizontally and vertically, a flaring apron between the conveyor and the digger and hinged to swing about a horizontal axis, and means for swinging the digger horizontally and vertically.

3. In a machine of the class described, a digger comprising a frame, a pair of parallel guides enveloping said frame, endless chains operating in each of said guides, a plurality of resiliently yielding digging members connecting said chains, and actuating means for said chains.

4. In a machine of the class described, a frame, an upright post on said frame, a second frame rotatably mounted on said post, a rigid digger pivotally connected to the outer end of said second frame, means on said post for raising and lowering the outer end of said digger, and means for rotating said second frame about said post.

5. In a machine of the class described, a main frame, a second frame pivoted thereon for horizontal movement, a digger pivoted on said second frame for vertical movement, and means for rotating said second frame about its pivot, said means comprising a rack secured to said main frame and a pinion carried by said second frame.

6. In a machine of the class described, a main frame, a conveyor thereon and inclined upwardly and rearwardly from the front end thereof, an apron supported above the front end of said conveyor, a digger on said frame and capable of movement about horizontal and vertical axes, said apron being under the inner end of said digger in all positions thereof.

7. A machine of the class described, a frame, a rigid digger pivoted thereon at one end, resiliently yielding means for raising and lowering the other end of said digger and holding it in position, and resiliently yielding digging members on said digger.

HUGH P. ROBBINS.